United States Patent
Kervin et al.

(10) Patent No.: US 12,326,871 B2
(45) Date of Patent: Jun. 10, 2025

(54) DETECTING DUPLICATE TABLES IN DATA LAKE DATABASES

(71) Applicant: International Business Machines Corporation, Armonk, NY (US)

(72) Inventors: Karina Elayne Kervin, Sacramento, CA (US); Jian Wu, Round Rock, TX (US); Sibasis Das, Kolkata (IN); Radha Mohan De, Howrah (IN); Swaminathan Balasubramanian, Troy, MI (US); Cheranellore Vasudevan, Bastrop, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/507,769

(22) Filed: Nov. 13, 2023

(65) Prior Publication Data

US 2025/0156435 A1 May 15, 2025

(51) Int. Cl.
| | |
|---|---|
| *G06F 16/20* | (2019.01) |
| *G06F 16/215* | (2019.01) |
| *G06F 16/22* | (2019.01) |
| *G06F 16/25* | (2019.01) |
| *G06N 5/022* | (2023.01) |

(52) U.S. Cl.
CPC ......... *G06F 16/254* (2019.01); *G06F 16/215* (2019.01); *G06F 16/2246* (2019.01); *G06N 5/022* (2013.01)

(58) Field of Classification Search
CPC ... G06N 5/022; G06F 16/215; G06F 16/2246; G06F 16/254
See application file for complete search history.

(56) References Cited

U.S. PATENT DOCUMENTS

| | | |
|---|---|---|
| 8,380,681 B2 | 2/2013 | Oltean et al. |
| 9,223,794 B2 | 12/2015 | Therrien et al. |
| 9,830,383 B2 | 11/2017 | Balasubramanian et al. |
| 10,198,460 B2 | 2/2019 | Gorelik et al. |
| 10,242,016 B2 | 3/2019 | Gorelik et al. |
| 10,445,062 B2 | 10/2019 | Oberbreckling et al. |
| 11,119,980 B2 | 9/2021 | Szczepanik et al. |
| 11,204,907 B2 | 12/2021 | VanderSpek et al. |
| 11,379,506 B2 | 7/2022 | Stojanovic et al. |

(Continued)

FOREIGN PATENT DOCUMENTS

| | | |
|---|---|---|
| CN | 11436418 A | 4/2022 |
| WO | 2020135048 A1 | 7/2020 |

OTHER PUBLICATIONS

Article entitled "Transforming Table to Knowledge Graph Using a Rule-Based Pipeline", by Yulianti et al., dated 2021. (Year: 2021).*

(Continued)

*Primary Examiner* — Mahesh H Dwivedi
(74) *Attorney, Agent, or Firm* — Tutunjian & Bitetto, P.C.; Michael A. Petrocelli (57) ABSTRACT

Detecting duplicate tables by converting relational tables to knowledge graphs; and mapping nodes in the knowledge graphs to sources in the relational tables. The method may further include applying graph matching to the knowledge graphs; and assessing degree of matching between matched knowledge graphs.

20 Claims, 8 Drawing Sheets

(56) References Cited

U.S. PATENT DOCUMENTS

| | | | |
|---|---|---|---|
| 11,449,499 B1* | 9/2022 | Alsaadi | G06F 9/30098 |
| 11,544,566 B2 | 1/2023 | Gupta et al. | |
| 2010/0063973 A1* | 3/2010 | Cao | G06F 16/2462 707/758 |
| 2010/0306412 A1 | 12/2010 | Therrien et al. | |
| 2012/0158672 A1 | 6/2012 | Oltean et al. | |
| 2015/0281292 A1* | 10/2015 | Murayama | G06F 3/0481 715/753 |
| 2021/0019232 A1 | 1/2021 | Murti et al. | |
| 2021/0397738 A1 | 12/2021 | Talreja et al. | |
| 2022/0021652 A1* | 1/2022 | Moghe | H04L 63/20 |
| 2022/0222543 A1* | 7/2022 | Khatibi | G06F 16/285 |
| 2022/0269659 A1 | 8/2022 | Wang et al. | |
| 2023/0004347 A1* | 1/2023 | Slager | G06F 7/32 |
| 2023/0229644 A1* | 7/2023 | Bremer | G06F 18/29 707/695 |
| 2024/0095241 A1* | 3/2024 | Zheng | G06F 16/9024 |

OTHER PUBLICATIONS

Article entitled "Construction and Application of a Knowledge Graph", by Hao et al., dated Jun. 26, 2021 (Year: 2021).*

Article entitled "Interpreting Language Models Through Knowledge Graph Extraction", by Swamy et al., dated Nov. 16, 2021. (Year: 2021).*

Article entitled Demonstrating MATE and COCOA for Data Discovery, by Becktepe et al., dated Jun. 23, 2023. (Year: 2023).*

Article entitled "Models of Similarity in Complex Networks", by Shvydun dated May 2, 2023. (Year: 2023).*

Article entitled "Structural-Semantic Approach for Approximate Frequent Subgraph Mining", by Moussaoui et al., dated 2015. (Year: 2015).*

Ma, G., Ahmed, N. K., Willke, T. L., & Yu, P. S. (Oct. 4, 2020). Deep graph similarity learning: A survey. Data Mining and Knowledge Discovery, 35, 688-725.

Dobroshinksy, S. (Feb. 5, 2020). Integrate and deduplicate datasets using AWS Lake Formation FindMatches. AWS Big Data Blog, Retrieved from https://aws. amazon. com/blogs/big-data/integrate-and-deduplicate-datasets-using-aws-lake-formation-findmatches, 1-24.

Livi, L., & Rizzi, A. (Aug. 21, 2012). The graph matching problem. Pattern Analysis and Applications, 16, 253-283.

Dibowski, et al., Using Knowledge Graphs to Manage a Data Lake, GI-INFORMATIK, Jan. 2021, 11 pages.

Lee et al. "Table2Graph: A Scalable Graph Construction from Relational Tables using Map-Reduce", IEEE First International Conference on Big Data Computing Service and Applications, 2015, 8 pages.

* cited by examiner

FIG. 1

TABLE 1

| REGISTRATION | CAR | TRUCK | BUS |
|---|---|---|---|
| WUJ1234 |  | X |  |
| KB13RT | X |  |  |
| NMY890 |  |  | X |

TABLE 2

| REGISTRATION | TYPE OF VEHICLE |
|---|---|
| WUJ1234 | TRUCK |
| KB13RT | CAR |
| NMY890 | BUS |

DETECTING DUPLICATE TABLES IN DATA LAKE DATABASES

BACKGROUND

The present invention generally relates to database management, and more particularly to detecting duplicate tables.

In a commercial data lake, there can be thousands of tables on-boarded from disparate sources. Duplicate tables in such data lakes are not only wasted storage, but can also lead to maintenance difficulties, as well as inconsistent query results. Duplicate data can also cause problems when the data is used in machine learning process. Unintentional use of duplicate data as training data could introduce bias in the trained model, and use of duplicate data in both training and testing, without knowing they are duplicate, would give false impression of good fitting. While there are a number of techniques to identify duplicate records (content-duplicates) semantically equivalent tables are very difficult to detect and eliminate. The schema may have been defined by different Data Architects and hence the syntactical schema is different, the information content of two or more tables can be same. A manual inspection is neither practical nor accurate as the semantic similarity cannot be detected by viewing the schema or even examining sample records.

SUMMARY

In accordance with an embodiment of the present invention, a computer implemented method is described for detecting duplicate tables that includes converting relational tables to knowledge graphs; mapping nodes in the knowledge graphs to sources in the relational tables; and applying graph matching to the knowledge graphs. The computer implemented method may further include assessing a degree of matching between matched knowledge graphs.

In another aspect, a system is provided for detecting duplicate tables. The system may provide for detecting duplicate tables including a hardware processor; and a memory that stores a computer program product. The computer program product of the system includes instructions may include to convert, using a hardware processor, relational tables to knowledge graphs; and to map, using a hardware processor, nodes in the knowledge graphs to sources in the relational tables. The computer program product may also apply, using a hardware processor, graph matching to the knowledge graphs; and to assess a degree of matching between matched knowledge graphs.

In yet another aspect, a computer program product is described for detecting duplicate tables. The computer program product includes a computer readable storage medium having computer readable program code embodied therewith. The program instructions executable by a processor to cause the processor to convert relational tables to knowledge graphs; and map nodes in the knowledge graphs to sources in the relational tables. The program instructions also include a sequence that includes to apply graph matching to the knowledge graphs; and to assess degree of matching between matched knowledge graphs.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

In accordance with one embodiment of the present disclosure, computer implemented methods, systems and computer program products are described herein that provide for identifying semantically similar data tables in one or more databases in a data lake. More particularly, in some examples, the computer implemented methods, systems and computer program products can detect the duplicate tables by examining and comparing the semantic structure of the two or more tables in a data lake. In some embodiments, the methods, systems and computer program products can transform a generated knowledge graph and compare with other potentially matching tables. In some embodiments, the methods, systems and computer program products can evaluate the level of similarity in tables and a threshold level for similarities in tables is set to alert potential duplicate tables and schema. In some embodiments, the methods, systems and computer program products can identify types of similarities in tables based on schema, information content, and coverage.

In some embodiments, based on the level and type of similarity in tables, the methods, systems and computer program products can recommend, flag and/or alert a user corrective and/or preventive steps directed to duplicate tables in databases, such as those in data lakes.

The computer implemented methods, systems and computer program products are now discussed with greater detail with reference to FIGS. 1-9.

Figure 1:
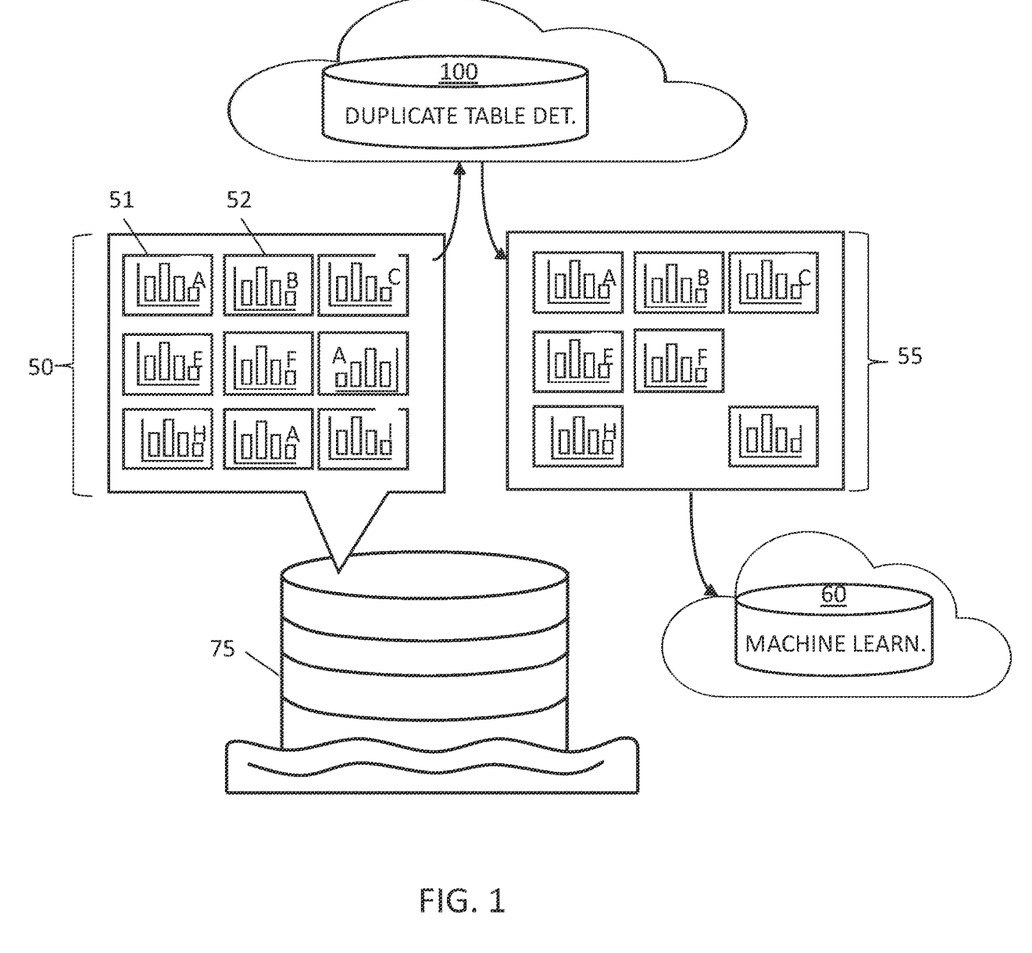
FIG. 1 is an illustration depicting an example environment in which the computer implemented methods, systems and computer program products employ the detection of duplicate tables for data lake databases, in accordance with an embodiment of the present invention.

FIG. 1 is an illustration depicting an example environment in which the computer implemented methods, systems and computer program products employ the detection of duplicate tables 51 for data. In some embodiments, a table duplicate detector 100, e.g., a table duplicate detector 100 that can be a cloud based service, can detect the duplicate tables 51 by examining and comparing the semantic structure of the two or more tables 50 in a data lake 75. A "data lake" is a centralized repository designed to store, process, and secure large amounts of structured, semi-structured, and unstructured data.

Figure 2:
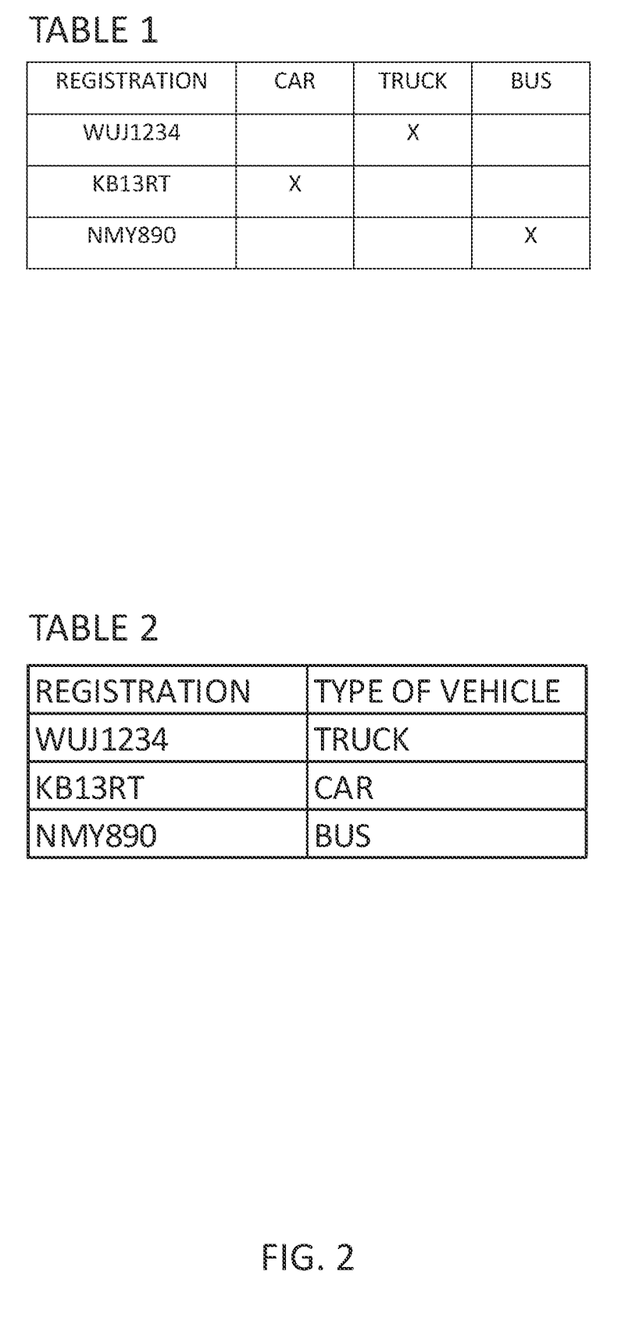
FIG. 2 is an illustration of an example of two different table configurations that include the same data.

FIG. 2 illustrates two tables having different configurations, while still representing the same data. For example, table 1 includes three columns of data corresponding to the identify the same data that is including in a single column in table 2. The two tables are structurally different and have different field labels. The difficulty of having multiple tables, such as these depicted in FIG. 2 is that when included in a data lake and not detected, when the data lake is used, the duplicate data is counted more than once, and therefore unintentionally given a greater weight than the remainder of data that does not include duplication.

Figure 3:
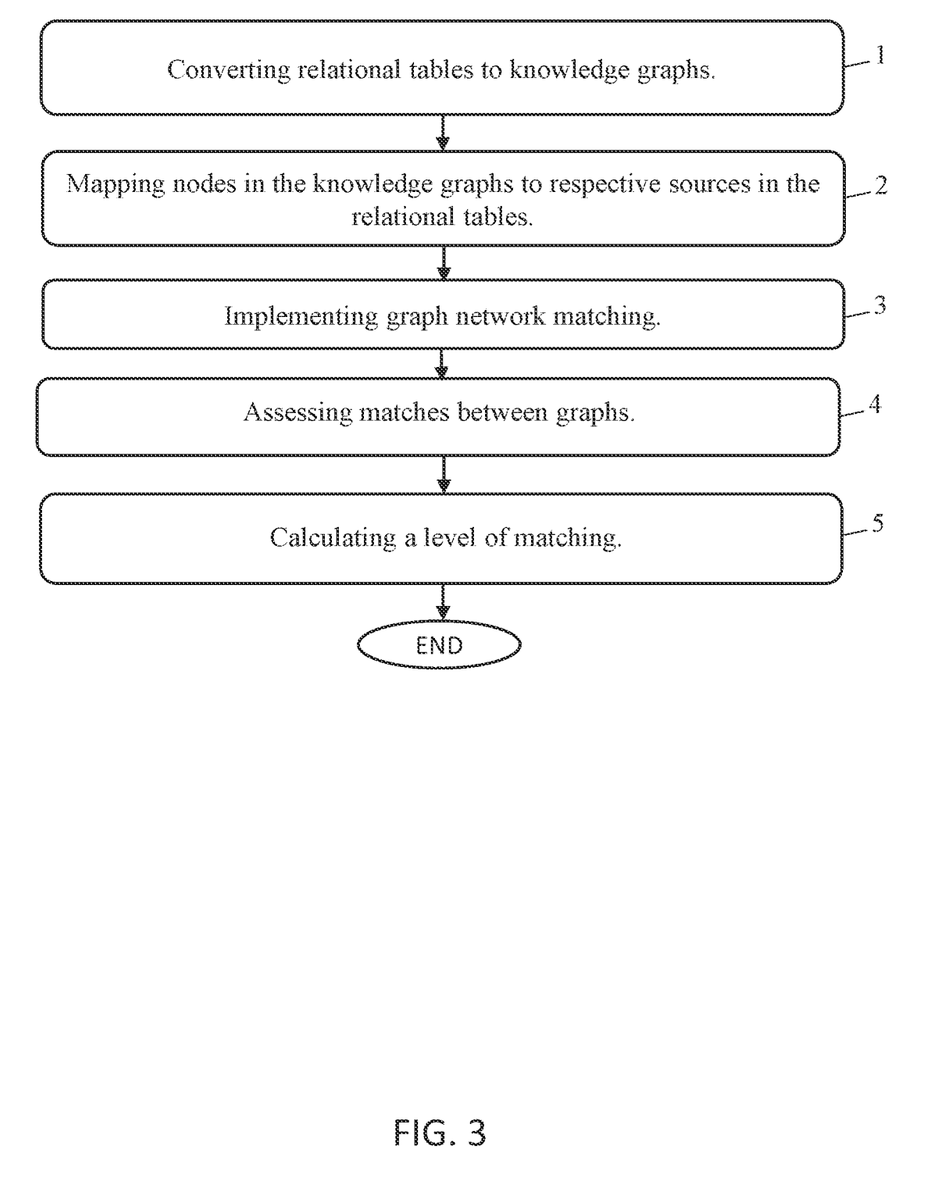
FIG. 3 a block/flow diagram showing a system/method that can detect duplicate tables in data lake databases, in accordance with an embodiment of the present invention.

FIG. 3 a block/flow diagram showing a system/method that can detect duplicate tables in data lake databases, in accordance with an embodiment of the present invention.

In some embodiments, one initial step of the computer implemented system may include converting relational tables into a knowledge graph at block 1 of FIG. 3. A "relational table" is a table of columns or fields that describe a listing (or rows) of data. For example, a relational table may contain fields such as customer ID, transaction number, product purchased, product price, sale date, and purchase location.

In some embodiments, in order to assess the similarity of information content between two or more tables, the contents with its syntactical structure are first converted to a semantic structure. In some embodiments, propose to use the knowledge graphs to represent the information A "knowledge graph", also known as a semantic network, represents a network of real-world entities—i.e. objects, events, situations, or concepts—and illustrates the relationship between them. This information is usually stored in a graph database and visualized as a graph structure, prompting the term knowledge "graph." A knowledge graph is made up of three main components: nodes, edges, and labels. Any object, place, or person can be a node. An edge defines the relationship between the nodes. For example, a node could be a client or an agency. An edge would be categorize the relationship as a customer relationship.

Knowledge graphs can be made up of datasets from various sources, which frequently differ in structure. Schemas, identities and context work together to provide structure to diverse data. Schemas provide the framework for the knowledge graph, identities classify the underlying nodes appropriately, and the context determines the setting in which that knowledge exists. These components help distinguish words with multiple meanings. Knowledge graphs, that are fueled by machine learning, can utilize natural language processing (NLP) to construct a comprehensive view of nodes, edges, and labels through a process called semantic enrichment. When data is ingested, this process allows knowledge graphs to identify individual objects and understand the relationships between different objects. This working knowledge is then compared and integrated with other datasets, which are relevant and similar in nature.

There are several approaches to converting relational databases to knowledge graph representation. One approach to convert a relational database into a graph database is founded on the property graph model.

Some of the properties, e.g., a type of order, can help in identifying the hierarchical nodes, as well. This approach is applicable to a range of graph database realizations, such as Neo4J, Titan and OrientDb. A scalable "map reduce" is another example that is suitable for converting relational databases into graph databases.

Topological analysis for the generation of heuristics in terms of betweenness, closeness and degree centrality to identify nodes can also contribute to converting relational tables to a knowledge graph representation. Mapping for a graph model can be generated, and then the model may be reused with minimal manual work. In some embodiments, mapping can be performed separately for nodes and edges.

For a node, mapping for converting relational tables to knowledge graphs can involve identifying an attribute (or a set of attributes) of the source schema to be converted as a target node. In some examples, other attributes that are included as properties in the target node, and a label that annotates the node. These attributes are labeled as key, property, and label. Similarly, an edge schema mapping includes key, property, and label. Mappings from a data source to the target model can be stored as an XML document. This can provide one example of performing block 2 of the method illustrated in FIG. 3. Block 2 can include mapping nodes in the knowledge graphs to respective sources in the relational tables.

Figure 4:
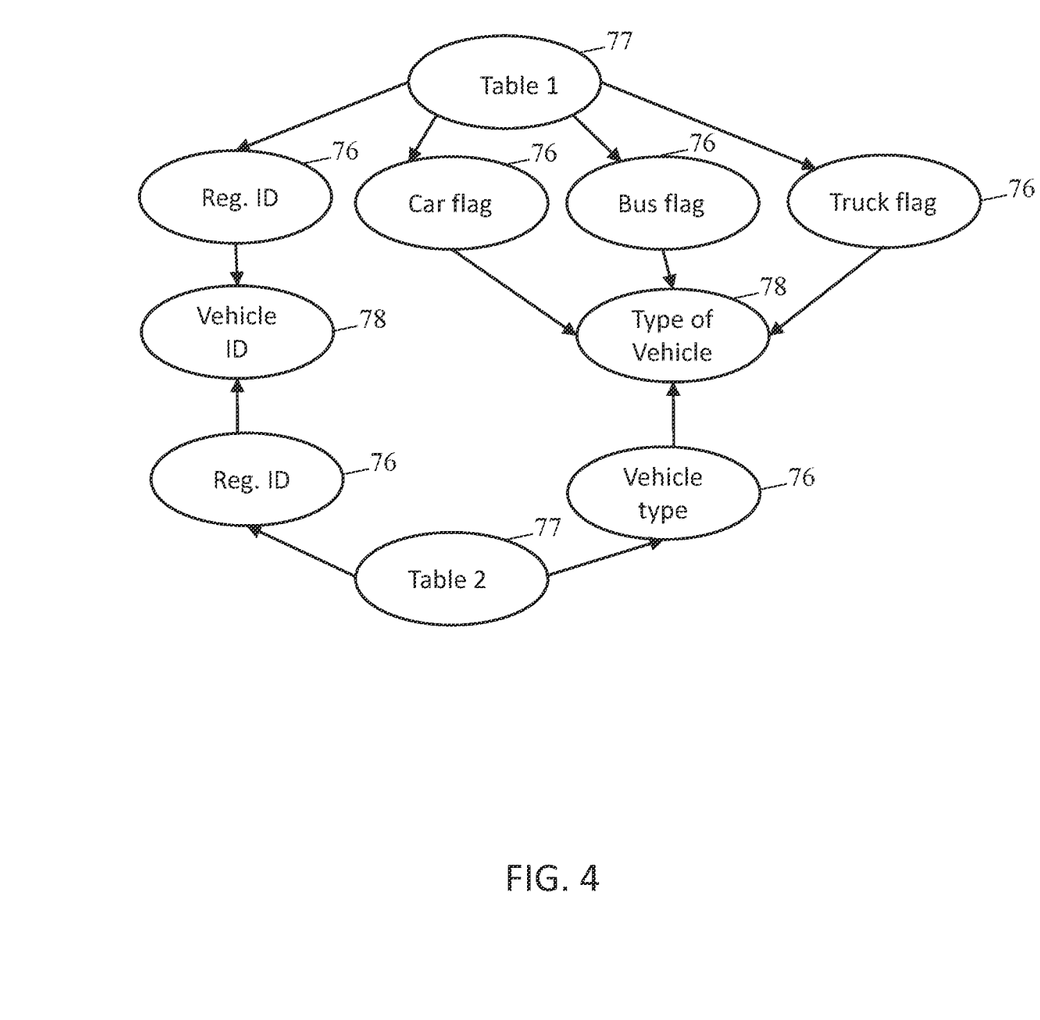
FIG. 4 is plot illustrating one example of a tri-partite graph from the tables depicted in FIG. 2, in accordance with one embodiment of the present disclosure.

FIG. 4 illustrates one example of converting relational tables, e.g., Tables 1 and 2 from FIG. 2, into a full network representation of the tables as knowledge graphs, as discussed above with reference to block 1 of FIG. 1.

In a following step, a standard query language and protocol for linked open data (SPARQL) query (or other graph retrieval language) is constructed to get pertinent table, column, and ontology concept information. In some embodiments, a tri-partite graph is constructed for each table. A multi-partite graph is a graph whose vertices are partitioned into different independent sets. A graph is tripartite if it can be partitioned in 3 independent sets. FIG. 4 is an illustration one example of a tri-partite graph. In some embodiments, the method may construct an entire graph and look for similar subgraphs.

Referring to FIG. 3 in some embodiments, the computer implemented method may continue to implementing graph network matching at block 3. In some embodiments, the computer implemented method can include using domain-specific ontologies, metadata of the nodes/entities/fields, and graph manipulation algorithms to do graph network matching. Block 3 can include assessing partial or full match between two or more graphs. This can include identifying subsets and/or subgraphs and/or branches. A subgraph is a graph whose vertices and edges are subsets of another graph.

FIG. 4 illustrates one example of converting relational tables, e.g., Tables 1 and 2 from FIG. 2, into a full network representation of the tables as knowledge graphs, as discussed above with reference to block 1 of FIG. 1. FIG. 4 further illustrates graph network matching. More particularly, referring to FIG. 4, the table columns, i.e., data included in the table columns, are represented by reference number 76, and the database tables, e.g., Table 1 and Table 2, are represented by reference number 77. From Table 1, the table columns 76 may be registration (Reg. ID), car (car flag), truck (truck flag), and bus (bus flag). From Table 2, the table columns 76 may be registration (Reg. ID) and type of vehicle (vehicle type).

Still referring to FIG. 4, the table columns from the different tables are linked to ontology concepts, e.g., ontology business concepts. An "ontology" is a formal description of knowledge as a set of concepts within a domain and the relationships that hold between them. Still referring to FIG. 4, in one example, the table columns 76 from the different tables Table 1 77 and Table 2 77 are linked to the ontology concepts 78 of vehicle ID 78 and type of vehicle 78, which are ontology business concepts.

Figure 5:
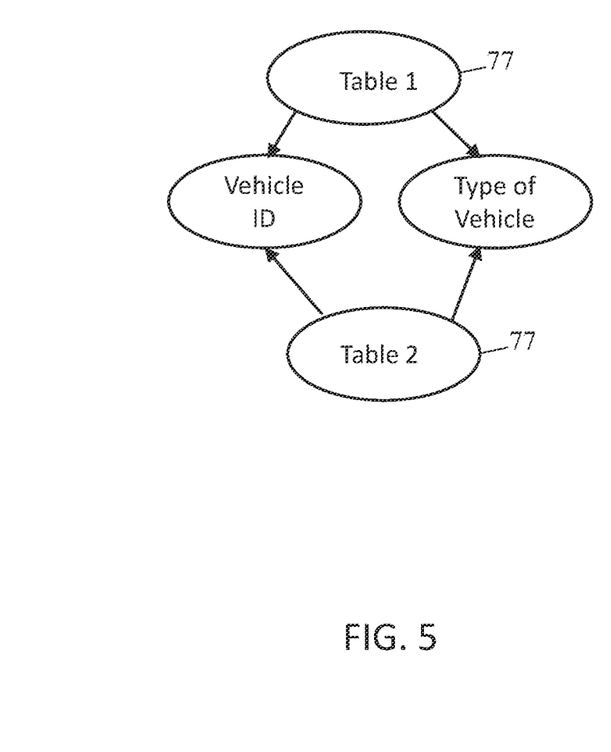
FIG. 5 is a plot illustrating collapsing the table graphs from FIG. 7 down to bi-partite graphs of tables.

Referring to FIG. 5, in some embodiments, the computer implemented methods can include collapsing the table graphs down to bi-partite graph of tables. The business terms with table/term links weight by number of columns linked to terms. For the example including the data depicted in FIG. 2, as demonstrated through FIGS. 4 and 5, the weight is 3 for the linkage between the database table 78 and the ontology concepts 78. Referring back to FIG. 4, for table 1, the number of entries for table columns 76 correlated to the type of vehicle is three, whereas for Table 2, the number of entries for table columns 76 correlated to the type of vehicle is 1, which illustrates a weight of 3 for table 1. FIG. 5 illustrates table based subgraphs of aggravated networks.

Figure 6:
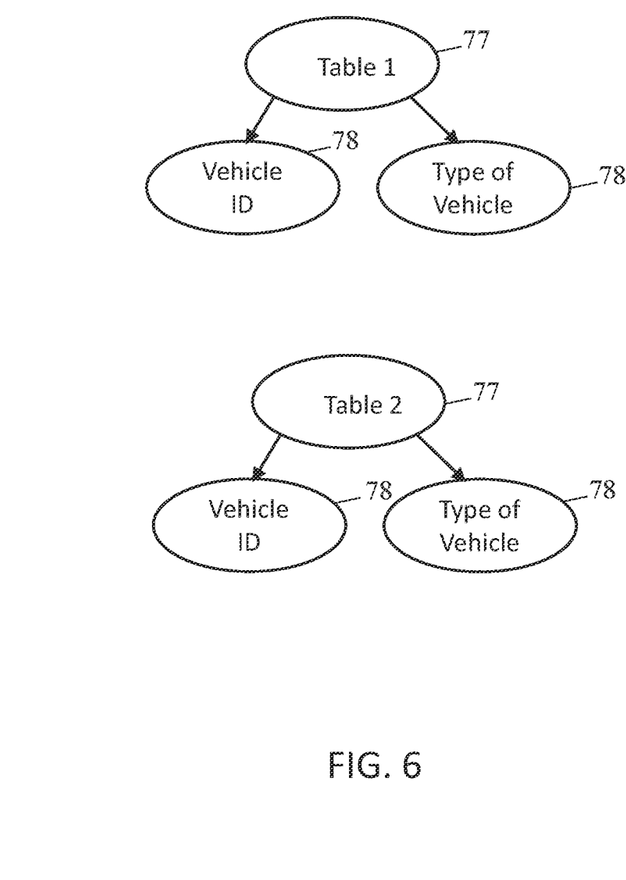
FIG. 6 is a plot illustrating table based subgraphs of aggravated networks, in accordance with one embodiment of the present disclosure.

The computer implemented method may further include assessing matches between graphs at block 4. In some embodiments, the method may further include to separate into table-based sub-graphs and look for similarity between sub-graphs, as illustrated in FIG. 6. In one embodiment, an algorithm for finding similarity between sub-graphs can include graph edit distance. The graph edit distance algorithm can match the graphs directly in their domain and, in general, are applicable to a wide class of graphs. In another embodiment, the algorithm for finding the similarity between subgraphs can include a graphs kernel. Graph kernels are based on the notion of similarity between two discrete objects that is evaluated on an implicitly induced feature space. Being able to define a kernel function for graphs permits importing the whole class of kernel machines on this domain. In yet another embodiment, the algorithm for finding the similarity between subgraphs can include graph embedding. In an even further embodiment, graph embedding can be provided by a node2vec used for encoding node embeddings. Then, two-dimensional (2D) histograms obtained from those node embeddings were passed to a classical 2D convolutional neural network (CNN) architecture designed for images. Such an approach enabled good results to be derived from many benchmark datasets. In yet another embodiment, the algorithm for finding the similarity between subgraphs can include embedding of the graph to obtain a general vector representation that is usually relative to the data. In another embodiment, the algorithm for finding similarity between subgraphs can include graph neural networks (GNNs). For example, the algorithm can use graph neural networks (GNNs) for similarity learning, including graph neural network (GNN), convolutional neural networks (CNN), Siamese GNNs. and GNN-based graph matching networks. In an even further embodiment, the algorithm for finding the similarity between subgraphs can include graph neural network (GNN) based graph matching networks. In some examples, graph neural network (GNN) based graph matching networks are applicable to weighted heterogeneous graphs.

Referring back to FIG. 3, the computer implemented method may continue to block 5. Block 5 includes interpreting and identifying a level of matching. In some embodiments, the method may include interpreting the level of match and marking/specifying any partially or fully matching graph networks as potential duplicate tables.

In one embodiment, an algorithm is employed for detecting duplicate tables that assumes nodes on the knowledge graph are in a {Type: Value}form. For example, as depicted in FIG. 7, a node may be inked to another node via an Ontology Business Term.

Figure 7:
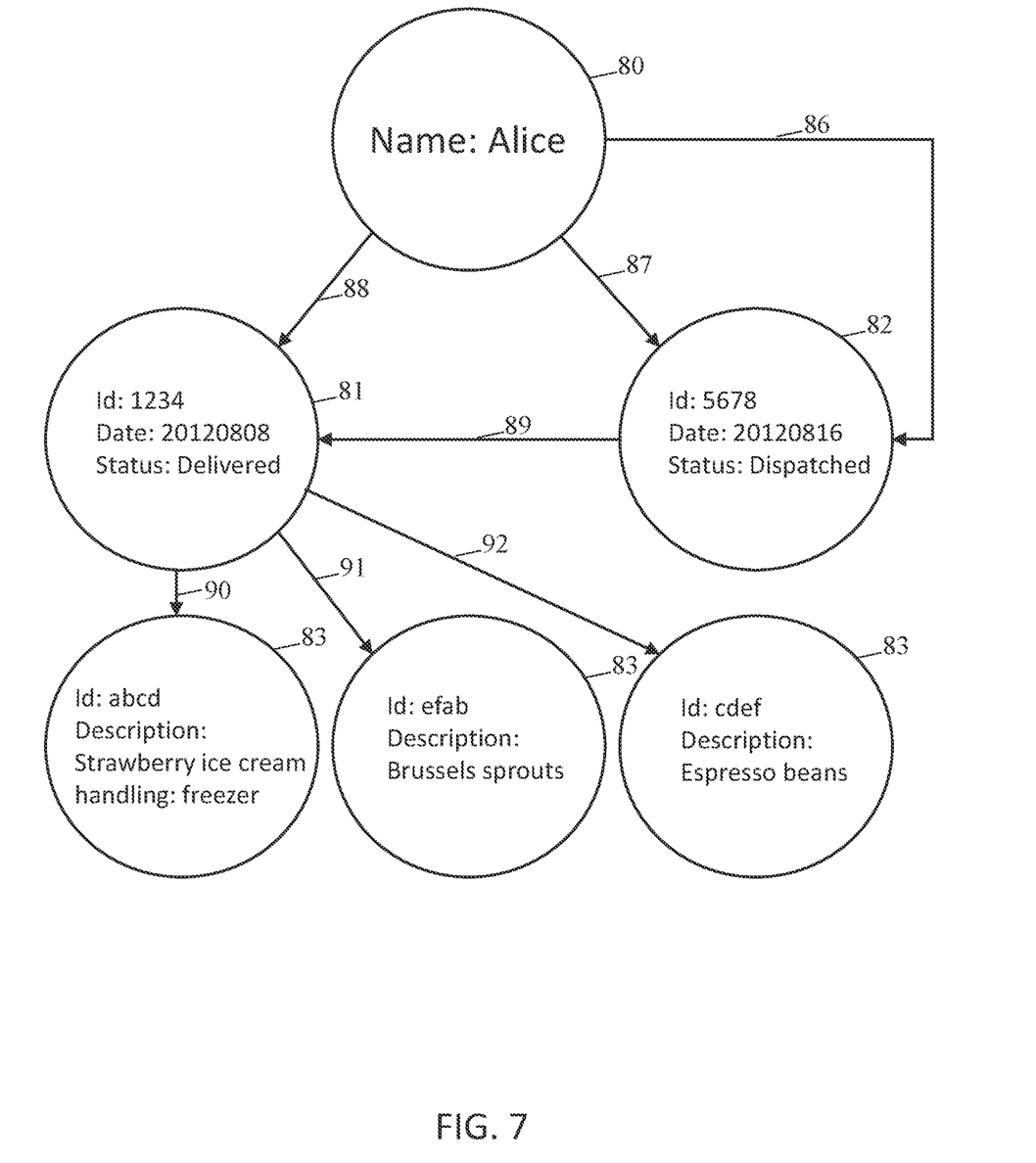
FIG. 7 is a plot illustrating modeling a user's order history in a graph node, in accordance with one embodiment of the present disclosure.

We refer to FIG. 7 to further express an example for detecting duplicate tables. FIG. 7 illustrates an example of a knowledge graph that is modeling a user's order history. In this example, the node is a user (user node 80), i.e., USER 1, having a name "Alice". As noted the knowledge graph is an order history for this user. The next nodes are for the orders 81, 82 of this example.

For example, the node having reference number 81 is illustrates a first order, i.e., ORDER 1 with ID 1234, having a date of Aug. 8, 2012, in which the status of the order is delivered. The user node 80 is linked to the node identified by 81 by the designation PLACED, i.e., a placed order.

For example, the node having reference number 82 illustrates a second order, i.e., ORDER 2 with ID 5678, having a date of Aug. 16, 2012, in which the status of the ordered is dispatched. The user node 80 is linked to the node identified by 82 by the designation PLACED, i.e., a placed order.

Still referring to the graph depicted in FIG. 7, the order nodes identified by 81,82 are linked to identify that node 81 is an order that is prior, i.e., PREVIOUS, to indicate an order in the timing at which the orders were made.

A next series of nodes 83 indicate the content of the orders.

It is noted that FIG. 7 illustrates a single graph, e.g., graph1. When detecting duplicate tables multiple graphs are considered, e.g, graph1 and graph2. In the following description an example is described in which two graphs, e.g., graph 1 and graph 2, are considered for determining duplicates, however any number graphs that have been converted from tables to knowledge graphs may be analyzed, e.g., 2 graphs, 3 graphs, 4 graphs, 5 graphs, 10 graphs, 15 graphs, 25 graphs, 50 graphs, 100 graphs, 150 graphs, 200 graphs, 300 graphs, 400 graphs, 500 graphs, 1000 graphs, etc.

Considering the example depicted in FIG. 7, block 5 includes interpreting and identifying a level of matching. In some embodiments, the method may include interpreting the level of match and marking/specifying any partially or fully matching graph networks as potential duplicate tables.

This can begin with a number of assumptions. For example, consistent with the Example depicted in FIG. 7, an assumption is made that the nodes for the knowledge graph are in {Type:Value}form. A further assumption is to assume the same well defined Ontology Business Terms are used in all knowledge graphs being considered i.e., any one term in the system has definite meaning, any two different terms have different meanings. Another assumption is to assume type. By assuming type, value pairs in all of the knowledge graph are also well defined. In this instance, the same type name always have the same definition and uses the same representation of values, regardless where they appear in the graph. Referring to FIG. 7, examples are as follows:

Numerical: uses one of the standard numerical representation

Date: uses a predefine format, for example, yyyymmdd format

Enumerates: is always tale values in a predefined set of enumerates like {ORDERED, DISPATCHED, . . . }.

Text, assume there is a text analytics tool available, we can always compare two text string to determine if they are semantically equivalent.

With the following assumption in place, the method can continue with comparing the a first node N1 in a first knowledge graph1 and a second node N2 in second knowledge graph2, to determine if they are equivalent. For example, the method can continue with a step of to define the first node N1 to be second node N2 if they have identical sets of type-values, as follows:

Define: N1 is equivalent to N2 if they have identical set of type-values

For example:
   N1: date: 20120808, status: delivered
   N2: date: 20120808, status: delivered
   N3: date: 20120809, status: delivered In the above example, there are three nodes N1, N2, N3, and an example of a type-value is "date: 20120808, status: delivered", which in the above example is identical for each of the nodes, i.e., N1, N2 and N3.

Accordingly, in this example: N1==N2, but N1 !=N3, N2 !=N3.

Furthermore, define linked-pairs. A linked pair is depicted in FIG. 10 by reference numbers 86, 87, 88, 89, 90, 91, 92 and 93. However, linked pairs may be expressed as following:

N1—link_x→Na
   N2—linky→Nb

Linked pairs can be defined as equivalent, if "N1—link_x→Na" are two lined pairs, with N1==N2, Na==Nb, and link_x==link_y.

Referring to FIG. 10, a graph of linked pairs can be represented as a set of linked-pairs: {n1→n2, . . . }. For example, the linked pairs illustrated in FIG. 10 can be represented as a set of 8 linkedpairs:

Reference number 88: User1 {name: Alice}→PLACED→Order id 1234 {date: 20120808, status: delivered}.
   Reference number 87: User1 {name: Alice}→PLACED→Order id 5678 {date: 20120816, status: dispatched}.
   Reference number 86: User1 {name: Alice}→MOST_RECENT→Order id 5678 {date: 20120816, status: dispatched}.
   Reference number 89: Order id 5678 {date: 20120816, status: dispatched}—PREVIOUS→Order id 1234 {date: 20120808, status: delivered}.
   Reference number 90: Order id 1234 {date: 20120808, status: delivered}—CONTAINS→Item id abcd {description: strawberry ice cream, handling: freezer}.
   Reference number 91: Order id 1234 {date: 20120808, status: delivered}—CONTAINS→Item id efab {description: brussels sprous}.
   Reference number 92: Order id 1234 {date: 20120808, status: delivered}—CONTAINS Item id cdef {description: espresso beans}.

The method may continue with using the following algorithm to find out redundant part of two knowledge graphs:
   a) Initialize common set C, to be empty set
      i. For each linked-pair, N1—link_x→Na of graph1:
      b. Search in linked-pair set of graph2:
         i. If found a LP in graph2, N2—link_y→Nb
            st. N2—link_y→Nb==N2—link_y→Nb
         ii. Save N2—link_y→Nb to common set C
         iii. Remove N2—link_y→Nb from graph2 as search candidate At the end of the above procedure, a common set C is provided, in which the linked-pairs in C are in both knowledge graph1 and knowledge graph2. In some embodiments, some of the linked-pairs in common set C may be linked together to form a sub-graph in the original knowledge graphs. In some embodiments, the linked-pairs may be sorted in C into one or more sub-graphs by the following:

For each un-marked linked-pair N1-Lx-Na in C:

a) Search if there exists marked linked-pair N2-Ly-Nb in C:
   a. Such that N2 == N1ORN2 == NaO0RNb == Na0RNb == N1
b) If such N2-Ly-Nb does exist:
   a. Set current_marker = marker of N2-Ly-Nb
   b. Continue search marked linked-pair N2' – Ly' – Nb' in C:
      i. If N2' == N1ORN2' == Na OR Nb' == NaO0RNb' == N1
         1. If marker of N2' – Ly' – Nb' is old_marker and old_marker != current_marker
            a. Find all linked-pairs marked as old_marker
               i. Re-mark them with current_marker
c) Else If no such N2-Ly-Nb exist:
   a. Set current_marker = new_marker
d) Mark N1-Lx-Na with current_marker
e) For each un-marked linked-pair N3-Lz-Nc in C:
   a. If N1 == N3ORN1 == Nc OR Na == Nc OR Na == N3
      i. mark N3-Lz-Nc with current_marker At the end of the above process, if there is one or more marked sub-graph SubG_i in C, then SubG_i is a common sub graph of both Graph1 and Graph2; there exists redundant parts of the two knowledge graphs.

Referring back to FIG. 1, the computer implemented method may further include calculating, e.g., interpreting and identifying, a level of matching between graphs at block 5. In some examples, block 5 may be referred to as measuring a level of redundancy between two or more graphs (knowledge graphs), e.g., graph1 and graph2. It is noted that the following description includes an example in which two graphs, e.g., graph 1 and graph 2, are considered for determining the level of redundancy, however this method is applicable to any two graphs.

In some embodiments, the measurement of redundancy is a percentage of contents that are shared between two knowledge graphs. For example, when considering two knowledge graphs, such as Graph1 and Graph2 as provided in the above example, the measurement of redundancy may be the percentage in Graph1 already in Graph2, calculated as follows:

$$\text{Size\_of}(SubG\_i)/\text{size\_of}(Graph1)$$

Where the Size_of (G) can be defined as: a number of nodes in G. Conversely, the percentage of contents in Graph2 already in Graph1, can be calculated as follows:

$$\text{Size\_of}(SubG\_i)/\text{size\_of}(Graph2)$$

Amount of savings for eliminate the redundant content can be calculated from the following:

$$\text{Size\_of}(SubG\_i)/(\text{size\_of}(Graph1)+\text{size\_of}(Graph2))$$

The above described equations illustrate one embodiment of interpreting and identifying a level of matching in accordance with block 5 of FIG. 3.

Following the determination of duplicate or similarity nodes in the knowledge graphs, the methods can then make use of the maps that have been established while converting data tables to knowledge graph. In one embodiment, this can be done by mapping the nodes from the knowledge graphs back to the relational tables. As noted above, relational tables are a table of columns or fields that describe a listing (or rows) of data.

The method may also include merging graphs including at least one matched portion. For example, if the similarity that is calculated in block 5 is 100%, the method may continue to examining the contents of the different graphs and possibly they can be combined. If the semantic similarity shows they are distinct but related, there is possibility to flag them to be combined column wise. In this technique, the objective is to identified potentially similar tables and flag them for detailed human expert interpretation and action.

Figure 8:
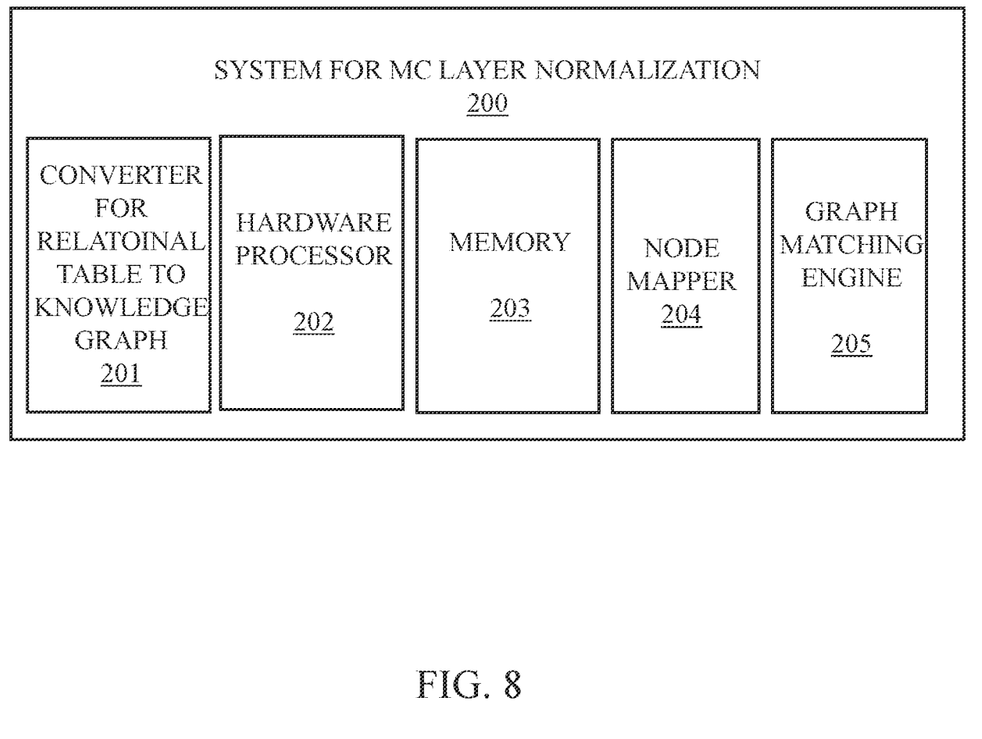
FIG. 8 is a block diagram illustrating a system detect duplicate records in a data lake, in accordance with one embodiment of the present disclosure.

In some embodiments, the computer implemented method that is depicted in FIG. 3 may be performed by a system 200 for detecting duplicate tables including a hardware processor 202, and a memory 203 that stores a computer program product, as depicted in FIG. 8. The computer program product of the system 200 includes instructions that can convert, using a hardware processor, relational tables to knowledge graphs. This may be performed by a converter for relational tables to knowledge graphs 201. Further details for the method steps for performing this function have been described above with reference to block 1 of FIG. 3. The system 200 can further map nodes in the knowledge graphs to sources in the relational tables. This step can be performed by a node mapper 204. The function of the node mapper 204 has been described above with reference to block 2 of FIG. 3.

The system 200 can further assess, using the hardware processor, a degree of matching between matched knowledge graphs, and the degree of matching between matched knowledge graphs. This step can be performed by a graph matching engine 205. The function of the graph matching has been described above with reference to blocks 3, 4 and 5 of FIG. 3.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 9:
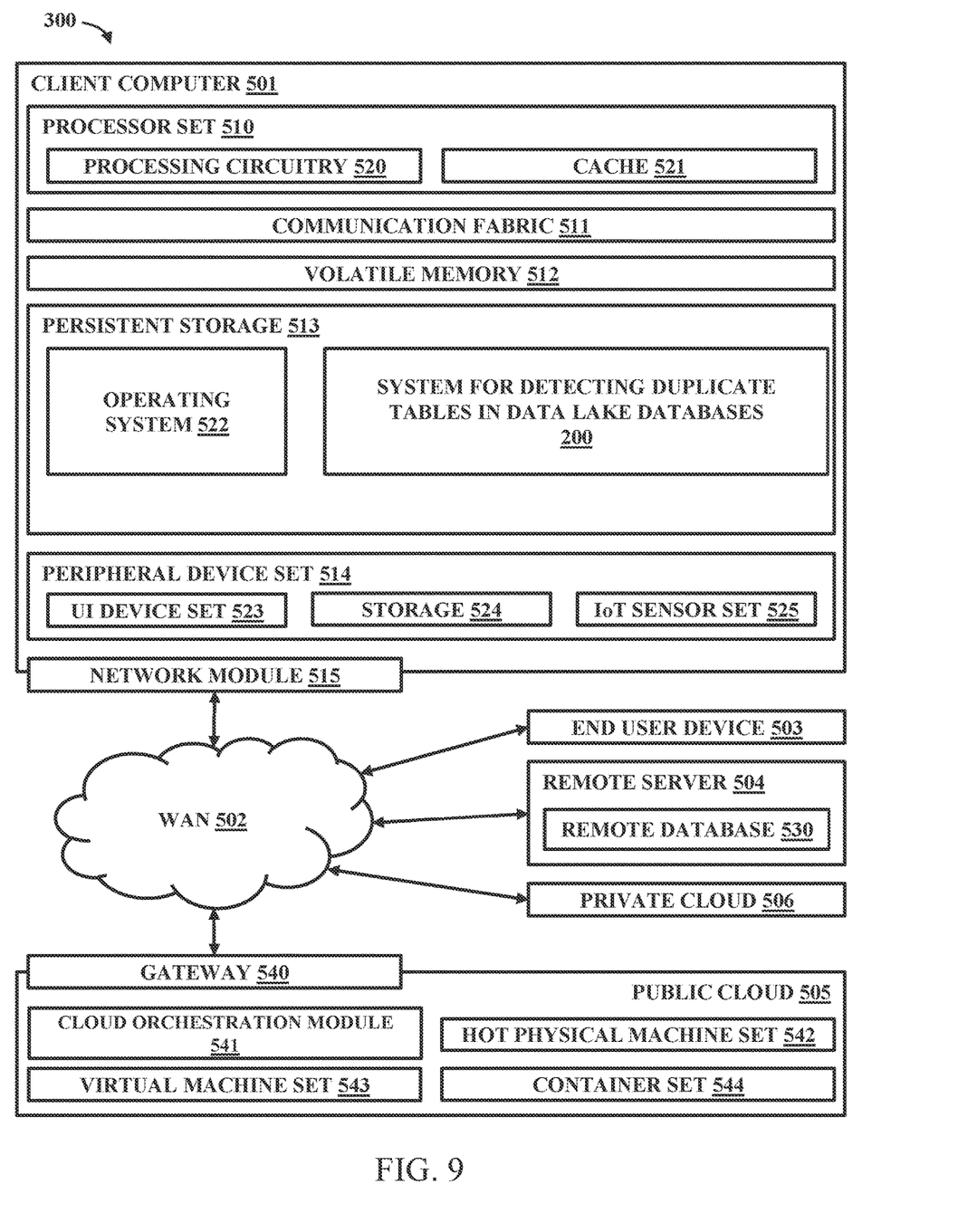
FIG. 9 depicts a computing environment according to an embodiment of the present disclosure.

Referring to FIG. 9, the computing environment 300 contains an example of an environment for the execution of at least some of the computer code involved in performing the inventive methods, such as the method for 200. In addition to block 200, computing environment 300 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 100, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 501, to keep the presentation as simple as possible.

Computer 501 may be located in a cloud, even though it is not shown in a cloud in FIG. 9. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 300, at least some of the instructions for performing the inventive methods may be stored in block 200 in persistent storage 513.

COMMUNICATION FABRIC 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 100 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 101 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 101 to communicate with other computers through WAN 102. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515. WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, in one embodiment a computer program product is described for detecting duplicate tables. The computer program product may include a computer readable storage medium having computer readable program code embodied therewith, the program instructions executable by a processor to cause the processor to convert relational tables to knowledge graphs; and map nodes in the knowledge graphs to sources in the relational tables. The computer program product can apply graph matching to the knowledge graphs; assess a degree of matching between matched knowledge graphs.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method for detecting duplicate tables in data lake databases (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer implemented method of detecting duplicate tables comprising:
   converting syntactical data from relational tables from a schema of a database to knowledge graphs having semantic data;
   mapping nodes in the knowledge graphs to sources in the relational tables;
   applying graph matching to the knowledge graphs;
   detecting semantically equivalent tables from the relational tables by assessing a degree of matching between matched knowledge graphs based on equivalent data from common linked-pair nodes, defined from relationships, from the knowledge graphs; and
   generating a corrective flag to eliminate the semantically equivalent tables from the relational tables from the schema of the database based on the degree of matching.

2. The computer implemented method of claim 1, wherein the relational tables comprise data arranged in columns.

3. The computer implemented method of claim 1, wherein the duplicate tables are present in a cloud based data lake.

4. The computer implemented method of claim 1, wherein the graph matching comprises using at least one of domain specific ontologies, metadata of the nodes, metadata of entities, metadata of fields, and graph manipulation algorithms to determine matches in graphs.

5. The computer implemented method of claim 4, wherein graph matching by domain specific ontologies includes separating the matched knowledge graphs into table-based sub-graphs and look for similarity between sub-graphs.

6. The computer implemented method of claim 1, wherein graph matching is a full match between at least two knowledge graphs.

7. The computer implemented method of claim 1, wherein graph matching comprises a partial match between at least two knowledge graphs.

8. The computer implemented method of claim 1, wherein graph matching comprises an algorithm selected from the group consisting of graph edit distance, graph kernel, graph embedded for general vector representation, graph neural networks, and combinations thereof.

9. A system for detecting duplicate tables including a hardware processor; and a memory that stores a computer program product, the computer program product of the system includes instructions comprising:

convert, using a hardware processor, syntactical data from relational tables from a schema of a database to knowledge graphs having semantic data;

map, using a hardware processor, nodes in the knowledge graphs to sources in the relational tables;

apply, using a hardware processor, graph matching to the knowledge graphs; and detect, using the hardware processor, semantically equivalent tables from the relational tables by assessing; a degree of matching between matched knowledge graphs based on equivalent data from common linked-pair nodes, defined from relationships, from the knowledge graphs; and generate, using the hardware processor, a corrective flag to eliminate the semantically equivalent tables from the relational tables from the schema of the database based on the degree of matching.

10. The system of claim 9, wherein the relational tables comprise data arranged in columns.

11. The system of claim 9, wherein the graph matching comprises using at least one of domain specific ontologies, metadata of the nodes, metadata of entities, metadata of fields, and graph manipulation algorithms to determine matches in graphs.

12. The system of claim 11, wherein graph matching by domain specific ontologies includes separating the matched knowledge graphs into table-based sub-graphs and look for similarity between sub-graphs.

13. The system of claim 9, wherein graph matching is a full match between at least two knowledge graphs.

14. The system of claim 9 wherein graph matching comprises a partial match between at least two knowledge graphs.

15. The system of claim 9, wherein graph matching comprises an algorithm selected from the group consisting of graph edit distance, graph kernel, graph embedded for general vector representation, graph neural networks, and combinations thereof.

16. The system of claim 9, wherein the duplicate tables are present in a cloud based data lake.

17. A computer program product for detecting duplicate tables, the computer program product including a computer readable storage medium having computer readable program code embodied therewith, the program instructions executable by a processor to cause the processor to:

convert syntactical data from relational tables from a schema of a database to knowledge graphs having semantic data;

map nodes in the knowledge graphs to sources in the relational tables;

apply graph matching to the knowledge graphs;

detect semantically equivalent tables from the relational tables by assessing a degree of matching between matched knowledge graphs based on equivalent data from common linked-pair nodes, defined from relationships, from the knowledge graphs; and generate a corrective flag to eliminate the semantically equivalent tables from the relational tables from the schema of the database based on the degree of matching.

18. The computer program product of claim 17, wherein the duplicate tables are present in a cloud based data lake.

19. The computer program product of claim 17, wherein the relational tables comprise data arranged in columns.

20. The computer program product of claim 17, wherein graph matching is a full match between at least two knowledge graphs, or a partial match between at least two knowledge graphs.

* * * * *